(12) United States Patent
Savransky et al.

(10) Patent No.: US 7,024,542 B2
(45) Date of Patent: Apr. 4, 2006

(54) SYSTEM AND METHOD OF REDUCING THE NUMBER OF COPIES FROM ALIAS REGISTERS TO REAL REGISTERS IN THE COMMITMENT OF INSTRUCTIONS

(75) Inventors: Guillermo Savransky, Haifa (IL); Ronny Ronen, Haifa (IL); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/183,096

(22) Filed: Jun. 26, 2002

(65) Prior Publication Data

US 2003/0126411 A1    Jul. 3, 2003

Related U.S. Application Data

(63) Continuation-in-part of application No. 10/039,113, filed on Jan. 2, 2002, now Pat. No. 6,910,121.

(51) Int. Cl.
G06F 9/38 (2006.01)

(52) U.S. Cl. .................................... 712/218; 712/23

(58) Field of Classification Search ................ 712/218, 712/23, 216, 217
See application file for complete search history.

(56) References Cited

U.S. PATENT DOCUMENTS 5,524,224 A * 6/1996 Denman et al. ............ 712/219
5,721,855 A * 2/1998 Hinton et al. ............... 712/218
5,835,748 A * 11/1998 Orenstein et al. ........... 712/217
6,604,190 B1 * 8/2003 Tran ........................... 712/207

OTHER PUBLICATIONS

Antonio Gonzales, et al. "Virtual-Physical Registers", HPCA-4, Feb. 1998.
C. Molina, et al., "Reducing Memory Traffic Via Redundant Store Instructions", In Proceedings of the international Conference on High Performance Computing and Networking, Apr. 1999.
Kevin M. Lepak, et al. "On the Value Locality of Store Instructions", In Proceedings of the 27th Annual International Symposium on Computer Architecture, Jun. 2000.

* cited by examiner

Primary Examiner—Henry W. H. Tsai
(74) Attorney, Agent, or Firm—Blakely, Sokoloff, Taylor & Zafman LLP (57) ABSTRACT

A processor system and method that reduces the number of register value copying made from alias registers to corresponding real (architectural) registers. One method entails not performing an alias register to real register copying if the incoming instruction does not designate a real register. Another method entails delaying alias register to real register copying until the corresponding reorder buffer (ROB) entry is actually written to. Yet another method entails not performing an alias register to real register copying if the ROB entry is the same as the existing ROB entry. And, still another method entails further delaying or stalling the allocation of an ROB entry.

24 Claims, 9 Drawing Sheets

FIG. 1A
(Prior Art)

REORDER BUFFER (ROB) 115

| ENTRY INDEX | EXEC. FLG | MEMORY ADDRESS | INSTRUCTION | ALIAS REGISTERS |
|---|---|---|---|---|
| 0 | | | | |
| 1 | | | | |
| 2 | | | | |
| 3 | | | | |
| 4 | | | | |
| 5 | | | | |
| ⋮ | | | | |
| 33 | | | | |
| 34 | | | | |
| 35 | | | | |
| 36 | | | | |
| 37 | | | | |
| 38 | | | | |
| 39 | | | | |

START-OF-BUFFER (at entry 3)

END-OF-BUFFER (at entry 35)

MODIFIED REORDER BUFFER 215

| ENTRY INDEX | VALID DATA | EXEC. FLAG | MEMORY ADDRESS | INSTRUCTION | ALIAS REGISTERS |
|---|---|---|---|---|---|
| 0 | | | | | |
| 1 | | | | | |
| 2 | | | | | |
| 3 | | | | | |
| 4 | | | | | |
| 5 | | | | | |
| ⋮ | | | | | |
| 33 | | | | | |
| 34 | | | | | |
| 35 | | | | | |
| 36 | | | | | |
| 37 | | | | | |
| 38 | | | | | |
| 39 | | | | | |

← START-OF-BUFFER (at entry 3)

← END-OF-BUFFER (at entry 33)

FIG. 2C

DATA COMMITMENT TABLE 216

| REAL REGISTERS | COMMITTED VALUE LOCATION | ROB ENTRY INDEX |
|---|---|---|
| EAX | | |
| EBX | | |
| ECX | | |
| EDX | | |
| ESI | | |
| EDI | | |
| EBP | | |
| ESP | | |
| TMP1 | | |
| TMP2 | | |
| ⋮ | | |
| TMPn-3 | | |
| TMPn-2 | | |
| TMPn-1 | | |
| TMPn | | |

SYSTEM AND METHOD OF REDUCING THE NUMBER OF COPIES FROM ALIAS REGISTERS TO REAL REGISTERS IN THE COMMITMENT OF INSTRUCTIONS

CROSS REFERENCE TO RELATED APPLICATION

The present patent application is a CIP of prior application Ser. No. 10/039,113, filed Jan. 2, 2002 now U.S. Pat. No. 6,970,121.

FIELD

This invention relates generally to processors, and in particular, a system and method of reducing the number of copies from alias registers to real registers in the commitment of instructions.

BACKGROUND

Developments in processors, such as microprocessors, microcontrollers, etc., are always on-going. The reason being is that there is a large demand for microprocessors to process instructions faster to reduce the execution time of a program, and more efficiently to reduce their overall power consumption. Techniques such as out-of-order processing, where instructions are executed not in the order provided by the program, have improved the performance of current processors. Even though the performance of processors have improved over the recent years, there are still some room for further improvement in the performance as illustrated in the following example.

Figure 1A:
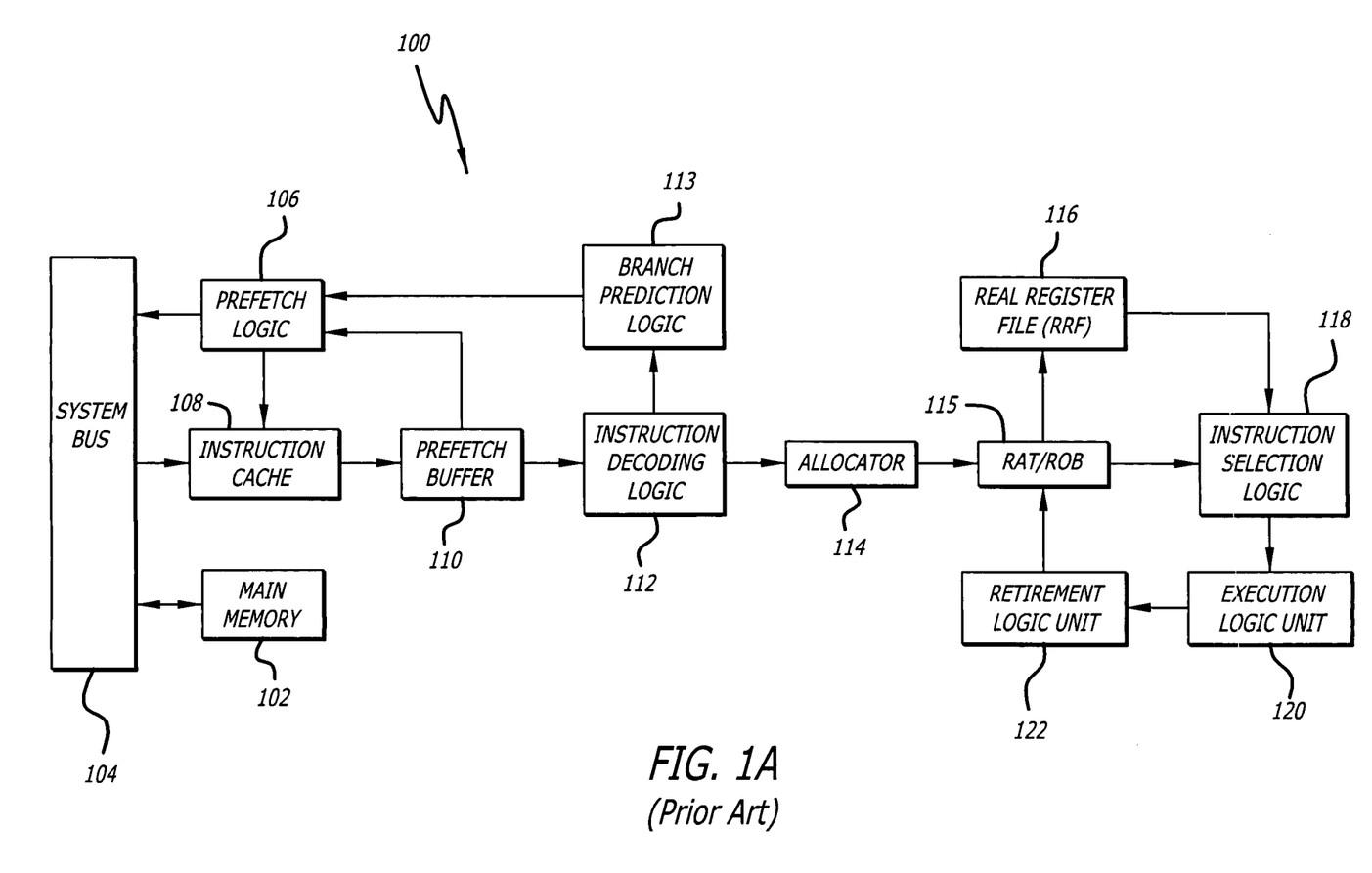
FIG. 1A illustrates a block diagram of a prior art processor system.

FIG. 1A illustrates a block diagram of a prior art processor system 100. In general, the processor system 100 retrieves program instructions initially stored in a main memory 102 by way of a system bus 104, and performs the execution of the program instructions. The processor system 100 consists of an instruction-retrieval front end including an instruction cache 108, a prefetch buffer 110, and a prefetch logic 106. The processor system 100 further consists of a pre-processing stage including an instruction decoding logic 112 and a branch prediction logic 113. Finally, the processor system 100 consists of an execution processing stage including an allocator 114, a register alias table/reorder buffer (RAT/ROB) 115, a real (architectural) register file (RRF) 116, an instruction selection logic 118, an execution logic unit 120, and a retirement logic unit 122.

In operation, the instruction-retrieval front end of the processor system 100 functions to place instructions in the pipeline for execution. Specifically, the prefetch logic periodically issues requests for instructions from the main memory 102 by way of the system bus 104. In response to these requests, instruction data is transferred to the instruction cache 108. The prefetch logic 106 also causes sequential instruction data of a certain size (e.g. 16 bytes of instruction data at a time) to transfer from the instruction cache 108 to the prefetch buffer 110. The prefetch buffer 110 stores a certain amount of sequential instruction data (e.g. 32 bytes). When the prefetch buffer 110 has some empty slots, a signal is sent to the prefetch logic 106 instructing it to transfer another set of instructions from the instruction cache 108 to the prefetch buffer 110 (e.g. 16-bytes at a time).

The pre-processing stage of the processor system 100 generally entails preparing the instruction data for subsequent processing by the execution stage. Specifically, the instruction decoding logic 112 receives the 32 bytes of instruction data from the prefetch buffer 110 and identifies the actual instructions within the instruction data by marking boundaries between instructions. If the processor system 100 processes sub-instructions such as micro-ops (i.e. fixed-length RISC instructions), then the instruction decoding logic 112 translates the identified instructions into micro-ops. If the instruction received is a branch, the address from which the instruction was accessed is sent to the branch prediction logic unit 113 to predict where the program will branch to. The branch prediction logic 113, based on its prediction determination, instructs the prefetch logic 106 to sequentially transfer the corresponding instructions to the prefetch buffer 110.

The execution stage of the processor system 100 generally entails queing, scheduling, executing, and retiring the instructions. The allocator 114 sequentially adds new instructions into the end of the reorder buffer (ROB) 115. The register alias table (RAT) portion of the RAT/ROB 115 assigns alias registers to function as real registers 116 for instructions that use source operands. The register alias table (RAT) keeps track of which real register 116 does an alias register corresponds.

Figure 1B:
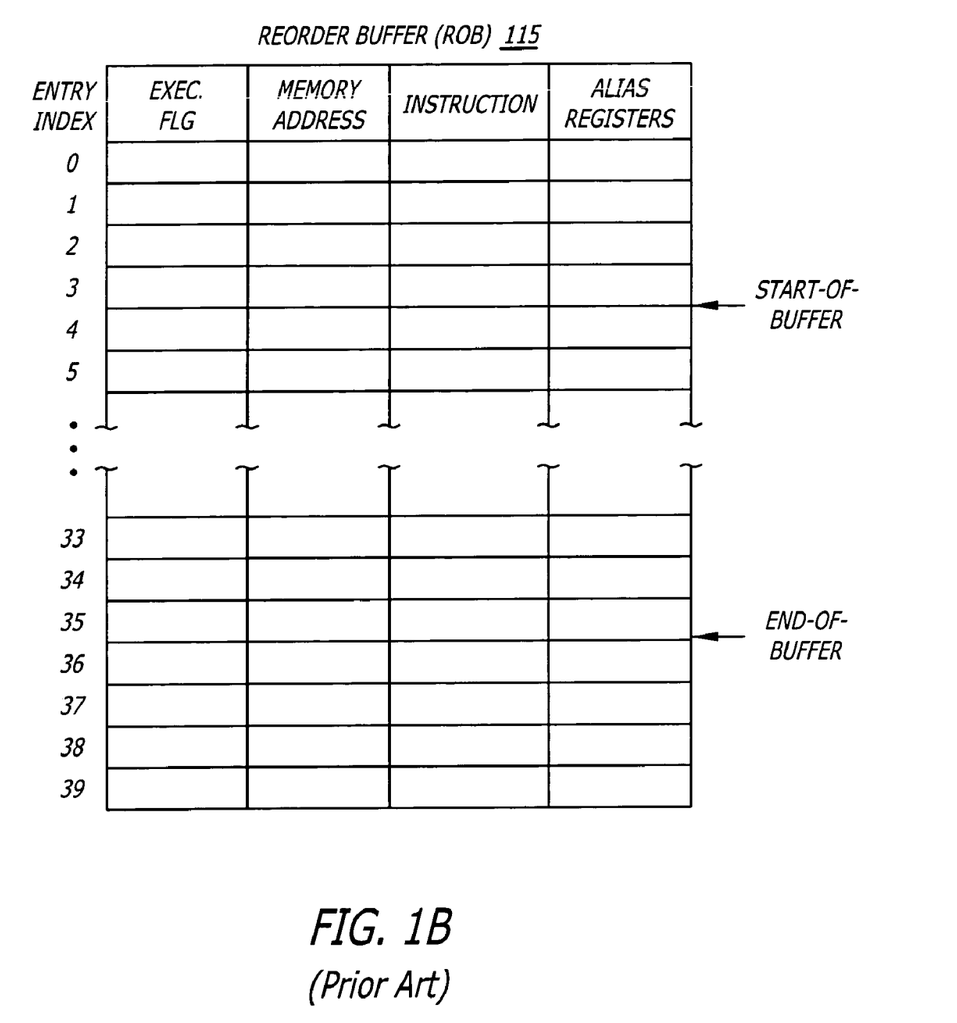
FIG. 1B illustrates a block diagram of a prior art reorder buffer as part of the prior art processor system.

As shown in FIG. 1B, each reorder buffer (ROB) entry includes a first field to indicate whether the corresponding instruction has been executed, a second field to store the memory address of the instruction to branch to if the corresponding instruction is a branch, a third field to store the corresponding instruction, and a fourth field to identify the corresponding alias registers holding the source operands for the corresponding instruction. The reorder buffer (ROB) 115 is a cyclic buffer having a start-of-buffer pointer that points to the first entry of the reorder buffer (ROB) 115, such as entry four (4) as shown, and an end-of-buffer pointer that points to the last buffer entry, such as entry 36 as shown. Thus, the entry pointed to by the start-of-buffer pointer contains the oldest instruction in the reorder buffer (ROB) 115 and the entry pointed to by the end-of-buffer pointer contains to the youngest instruction in the reorder buffer (ROB) 115.

The instruction selection logic 118 selects and queues the instructions to be executed. The instructions can be selected out-of order. The criteria used by the instruction selection logic 118 to select an instruction is whether all prior conditions have been met for the instruction to execute. The execution logic unit 120 executes the instructions in the order selected by the instruction selection logic 118. After the instruction has been successfully executed, the retirement logic unit 122 sets the executed flag in the reorder buffer (ROB) 115. If and when the executed instruction becomes the oldest instruction in the reorder buffer (ROB) 115, the instruction is committed, and the retirement unit 122 causes the copying of the register result of the executed instruction from the corresponding alias register to the designated real register 116.

It is this copying that results in some inefficiencies in the processor system 100. The copying is expensive in terms of power consumption since it includes reading and writing operations. Reducing the number of copies from alias registers to the real register file (RRF) could result in lower power consumption, extended battery life and a less sophisticated cooling system for the processor.

DETAILED DESCRIPTION

Figure 2A:
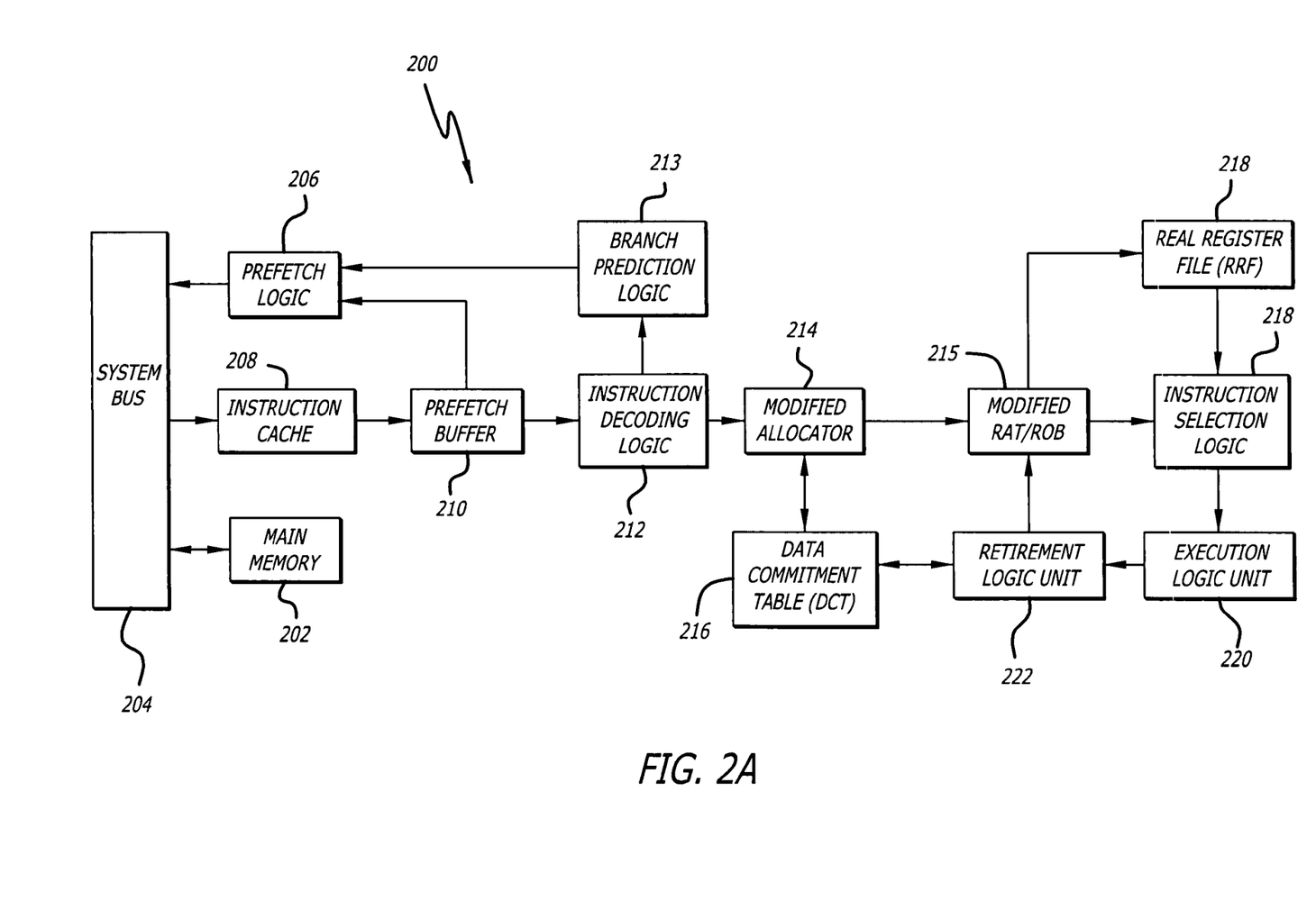
FIG. 2A illustrates a block diagram of an exemplary processor system in accordance with an embodiment of the invention.

FIG. 2A illustrates a block diagram of an exemplary processor system 200 in accordance with an embodiment of the invention. In general, the processor system 200 retrieves program instructions initially stored in a main memory 202 by way of a system bus 204, and performs the execution of the program instructions. The processor system 200 comprises an instruction-retrieval front end including an instruction cache 208, a prefetch buffer 210, and a prefetch logic 206. The processor system 200 further comprises a pre-processing stage including an instruction decoding logic 212 and a branch prediction logic 213. The processor system 200 also comprises an execution processing stage including a modified allocator 214, a modified register alias table/reorder buffer (RAT/ROB) 215, a data commitment table 216, a real register file (RRF) 217, an instruction selection logic 218, an execution logic unit 220, and a retirement logic unit 222. The instruction-retrieval front end and the pre-processing stage of the processor system 200 performs the instruction fetching and prediction the same as described with reference to the prior art processor system 100.

It is in the execution processing stage where the method of reducing the number of copies from alias registers to real registers in the commitment of instructions is implemented. In general, the method entails determining whether to copy the register value generated by executing an instruction from the alias register to the real register at the time the reorder buffer entry associated with the alias register is needed for a new instruction. If before the reorder buffer is needed for a new instruction, an interim instruction resulted in a new register value for the real register, then the original register value would be invalid at the time the reorder buffer entry is needed for the new instruction. Thus, there would not be a need to copy the original register value to the real register. The reduction in copying can make the processor system consume less power and execute instructions faster and more efficiently.

More specifically, the execution stage of the processor system 200 generally entails queing, scheduling, executing, and retiring the instructions. The modified allocator 214 performs several functions. The allocator 214 first checks whether a candidate ROB entry for a new instruction has valid register data. If it does, the allocator 214 causes a copying of the register data from the alias register to the corresponding real register. Second, the allocator 214 updates the data commitment table so that it indicates that the register data is now in the real register. Third, the allocator 214 deasserts the valid data bit in the candidate ROB entry. Finally, the allocator 214 causes the copying of the new instruction information into the candidate ROB entry.

The register alias table (RAT) portion of the modified RAT/ROB 215 assigns alias registers to function as real registers 217 for instructions that use source operands. The register alias table (RAT) keeps track of which real register 217 does an alias register corresponds.

Figure 2B:
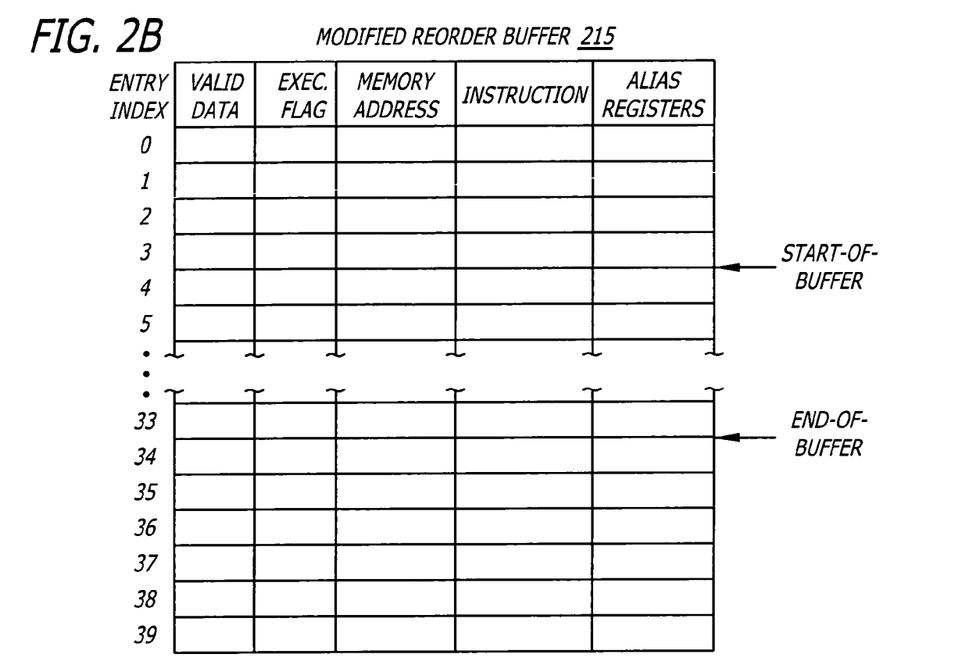
FIG. 2B illustrates a table diagram of an exemplary modified reorder buffer (ROB) in accordance with an embodiment of the invention.

FIG. 2B illustrates a table diagram of an exemplary modified reorder buffer (ROB) 215 in accordance with an embodiment of the invention. Each reorder buffer (ROB) includes: a first field to indicate whether the corresponding alias register holds valid data, a second field to indicate whether the corresponding instruction has been executed, a third field to store the memory address of the instruction to branch to if the corresponding instruction is a branch, a fourth field to store the corresponding instruction, and a fifth field to identify the corresponding alias registers holding the source operands for the corresponding instruction. The reorder buffer (ROB) 215 is a cyclic buffer having a start-of-buffer pointer that points to the first entry of the reorder buffer (ROB) 215, such as entry four (4) as shown, and an end-of-buffer pointer to point to the last entry of the reorder buffer (ROB) 215, such as entry 34 as shown. Thus, the entry pointed by the start-of-buffer pointer is the oldest instruction in the reorder buffer (ROB) 215 and the entry pointed to by the end-of-buffer pointer is the youngest instruction in the reorder buffer (ROB) 215.

Referring back to FIG. 2A, the instruction selection logic 218 selects and queues the instructions to be executed. The instructions can be selected out-of order. The criteria used by the instruction selection logic 218 to select an instruction is whether all conditions for executing the instruction have been met. The execution logic unit 220 executes the instructions in the order selected by the instruction selection logic 218. After the instruction has been successfully executed, the retirement logic unit 222 assists in the retirement of instructions in accordance with a new method in accordance with the invention, as is discussed below with reference to FIG. 3. A data commitment table 216 will be used to keep track of the location of committed register data as discussed below with reference to FIGS. 3–4.

Figure 2C:
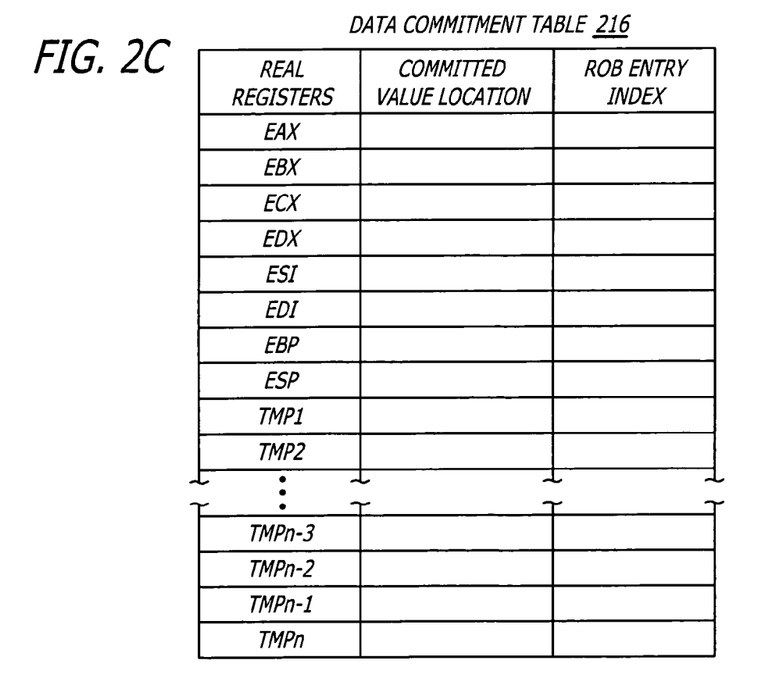
FIG. 2C illustrates a table diagram of an exemplary data commitment table (DCT) in accordance with an embodiment of the invention.

FIG. 2C illustrates a table diagram of an exemplary data commitment table 216 in accordance with an embodiment of the invention. The data commitment table 216 provides information as to the location of the register values for the corresponding real registers, i.e. whether a register value is in the real register file 217 or in an alias register identified in the ROB 215. Each data commitment table entry includes a first field to identify the real register, a second field to indicate whether the register value is in the corresponding real register (e.g. a Boolean field, a flag, etc.), and a third field to indicate the ROB entry index identifying the alias register storing the register value if the second field indicates that the register value is not in the real register.

Figure 3:
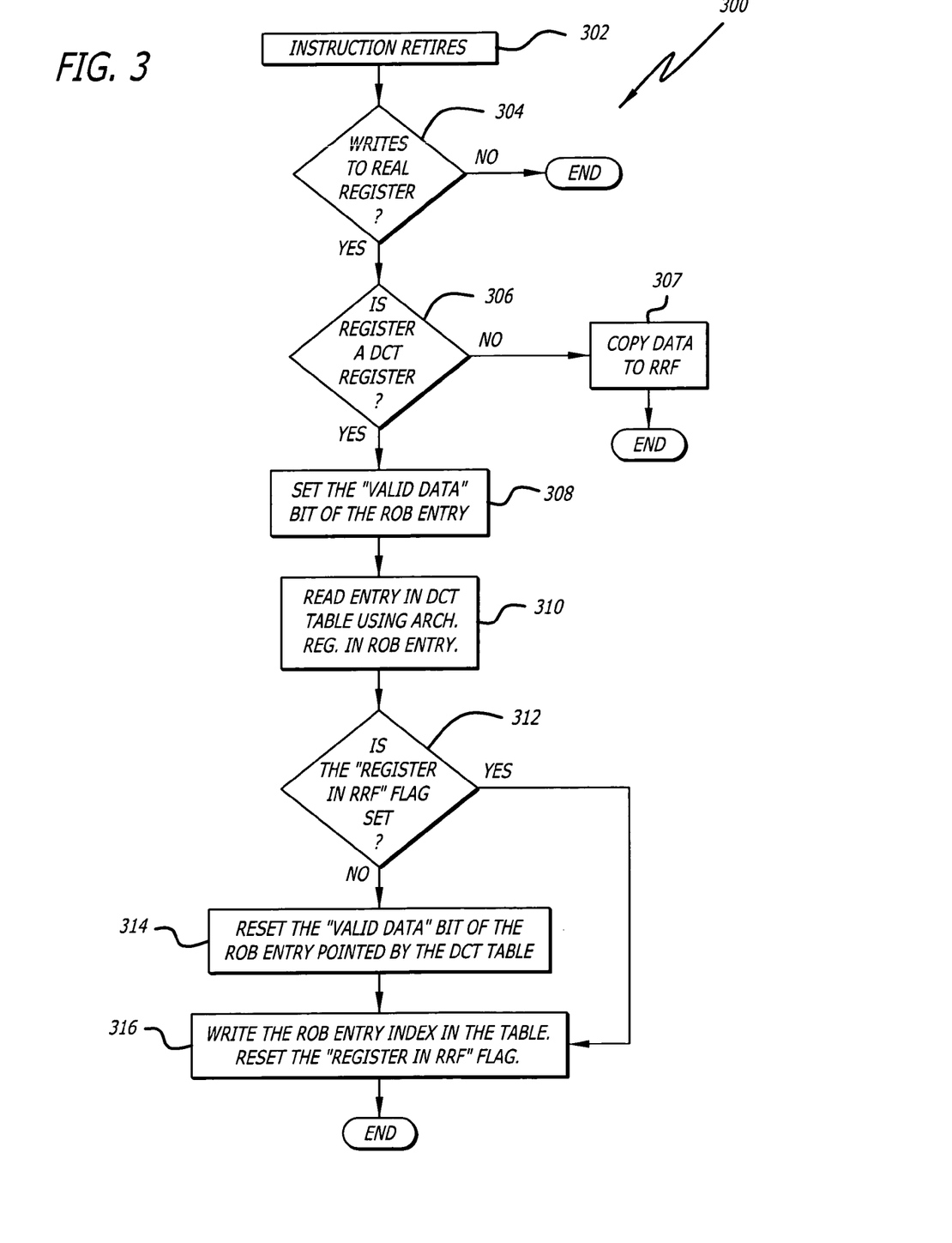
FIG. 3 illustrates a flow diagram of an exemplary retirement routine in accordance with an embodiment of the invention.

FIG. 3 illustrates a flow diagram of an exemplary retirement routine 300 in accordance with an embodiment of the invention. The steps of the retirement routine are taken after a successful execution of an instruction. In step 302, the retirement logic unit 222 sets the executed flag in ROB entry corresponding to the instruction. In step 304, the retirement logic unit 222 determines whether there is a destination real register 217 for the instruction. If there is no destination real register 217 for the instruction, the retirement routine 300 ends. If, on the other hand, there is a destination real register 217 for the instruction, in step 306 the retirement logic unit 222 determines whether the real register 217 is designated to undergo the retirement routine 300 in accordance with the invention (i.e., whether the register is one listed in the data commitment table 216).

Not all the real registers of the processor system 300 need to undergo the new retirement routine in accordance with the invention. It may be desirable to not include some real registers in the new retirement scheme. In such a case, at the time of retirement, the value generated by the executed instruction is copied to the corresponding register. For example, in the X86 processor, the segment and control registers can be excluded. There is only a small possibility that the segment and control registers are updated within the same instruction window (the size of the ROB). Thus, there is little to be gained, since almost every write to these registers will be copied to the real registers when a new instruction is to occupy the corresponding ROB entry. Also, not including all the real registers in the new retirement routine 300 reduces the size of the data commitment table, and reduces the overall power consumption. In addition, instruction that writes a value into partial registers may also be excluded from the new retirement routine 300.

Accordingly, if in step 306 the retirement logic unit 222 determines that the real register to be written to is exempt from the new retirement routine 300, then in step 307 the retirement logic unit 222 causes the copying of the resulting data from the alias register to the real register. Otherwise, in step 308, the retirement logic unit 222 causes the setting of the valid data bit in the ROB entry pertaining to that instruction. In step 310, the retirement logic unit 222 reads the committed value location field of the data commitment table 216 corresponding to the real register to determine if the previous register value is in the real register or in an alias register. If the retirement logic unit 222 determines that the previous register value is in an alias register, in step 314 the retirement logic unit 222 causes a deasserting of the valid data bit of the ROB entry pointed to by the data commitment table 216. Then in step 316 the retirement logic unit 222 causes the writing of the ROB entry index of the instant instruction to the ROB entry index field of the data commitment table 216 corresponding to the real register associated with the new data, and modifies the committed data location field to indicate that the register value is in an alias register pointed to by the corresponding ROB entry index field. If, on the other hand, in step 312 the retirement logic unit 222 determines that the previous register value is in the RRF 216, the retirement logic unit 222 just performs the function specified in step 316 as previously discussed.

The new retirement routine 300 saves an alias register-to-real register copying step (relative to the prior art retirement routine) each time the retirement routine 300 performs step 314. This situation occurs when the same real register is written to (actually written to its alias in the ROB) by two or more instructions within the same instruction window (the size of the ROB) and the entry corresponding to the oldest instruction is not reclaimed before the younger instructions retires. This is substantially different than the prior art retirement routine that makes an alias register-to-real register copy each time an instruction retires. Whereas the new retirement routine 300, avoids some of these copies, and in theory, can eliminate essentially 100 percent of the register writes if the code reuses results extensively, e.g. a long series of "inc eax; inc eax; inc eax, . . . ". Accordingly, the reduction in real register copying has the beneficial results of lower power consumption, extended battery life and a less sophisticated cooling system for the processor, among other benefits.

Figure 4:
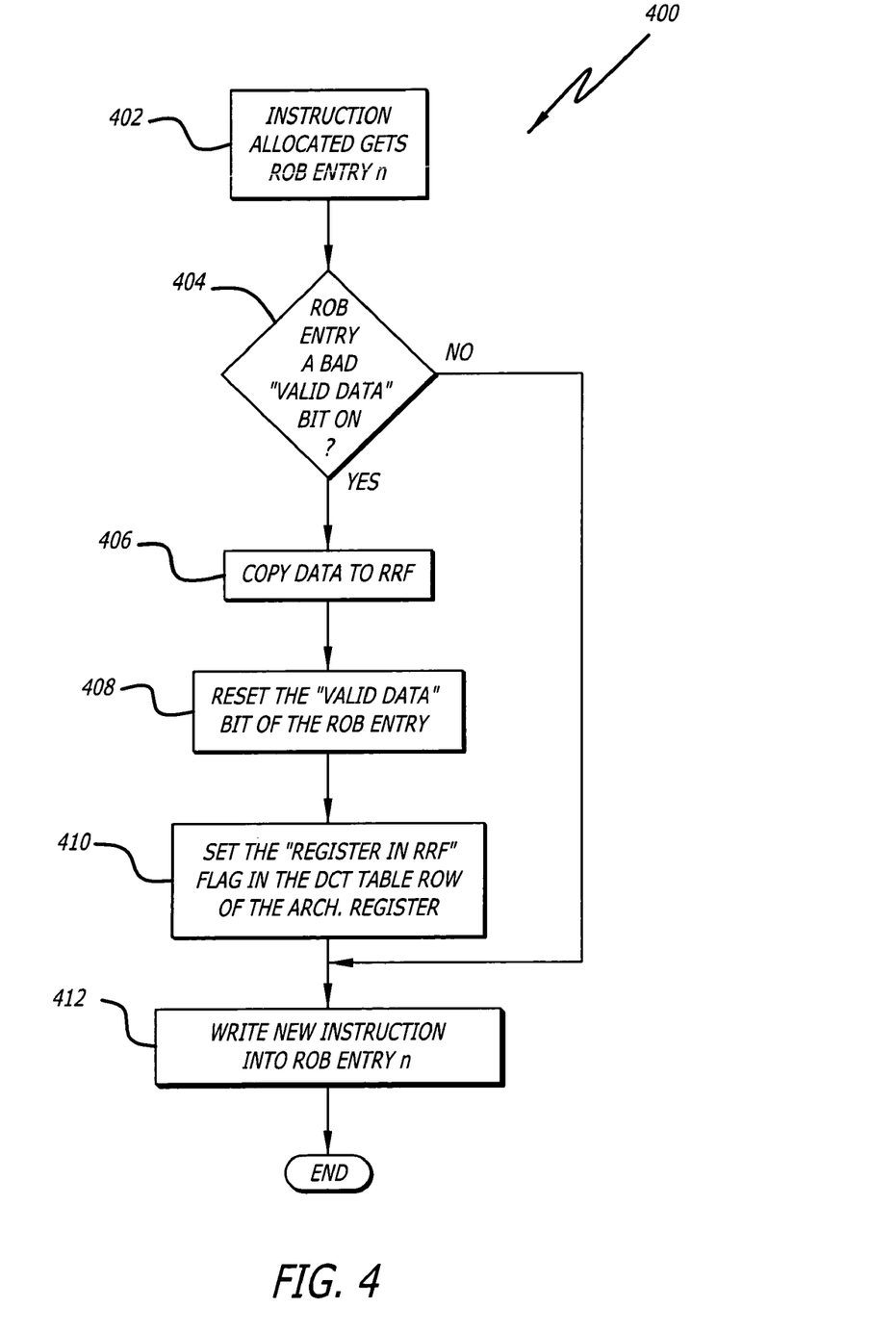
FIG. 4 illustrates a flow diagram of an exemplary ROB entry allocating routine in accordance with an embodiment of the invention.

FIG. 4 illustrates a flow diagram of an exemplary ROB entry allocating routine 400 in accordance with an embodiment of the invention. Basically, the allocator 214 first checks to see if the candidate ROB entry for a new instruction has valid data. As previously discussed, an ROB entry can have valid data if within a period of the cyclic ROB, the real register corresponding to the candidate ROB entry was not written to more than once by retired instructions. In this case, before the allocator 214 can use the candidate ROB entry, it has to cause a copying of the alias register of the ROB entry to the corresponding real register 217. Once this has occurred, the allocator 214 can use the candidate ROB entry for the new instruction.

Specifically, in step 402 the allocator 214 locates the next ROB entry n for a new instruction. In step 404, the allocator 214 reads the valid data field of the next ROB entry n to determine whether the corresponding alias register contains valid data. If not, the allocator 214 proceeds to step 412 to add the new instruction into the next ROB entry n. If, however, the valid data field indicates that the next ROB entry n has valid data, in step 406 the allocator 214 causes the content in the alias register of the next ROB entry n to be copied into the corresponding real register 217. In step 408, the allocator 214 deasserts the valid data bit in the next ROB entry n since the new instruction has not been executed, and therefore the next ROB entry n has yet to have valid data. Then in step 410 the allocator 214 modifies the "committed value location" field of the data commitment table 216 to indicate that the register value for the corresponding real register of the instruction to be overwritten is now in the real register 217. Finally, in step 412 the allocator 214 causes the new instruction to be added into the next ROB entry n.

In the case that there has been a branch misprediction, or other control flow altering event, like an exception, all the non-committed registers younger than the branch in the ROB 215 are invalid. In the prior art processor system the processor waits until the faulting instruction retires and then, all non-committed register are discarded by setting the renamer table entry of each register to point to the corresponding entry of the RRF. However, according to the new processor system 200, some of the committed data will reside in the ROB 215. According to the processor system 200 of the invention, this can be dealt with in two manners. The first option is to copy the committed data in the ROB 215 to the RRF 217 in the time the pipeline fills up again. The second option is to make the pointers in the renamer to point to the ROB entry that the data commitment table indicates. For example, if an instruction that writes to the EAX register is committed from the ROB entry index 31, the data commitment table entry corresponding to the EAX will contain the number 31 in the corresponding ROB entry index field. After a branch misprediction, the renamer will now point to the last value or the EAX to ROB entry 31. An instruction that has as a source the register EAX, will get its source renamed to ROB entry 31, so it will get the correct data.

In the case that the processor system 200 uses micro-ops, temporary registers are used to keep intra-instruction information. The values of these registers are invalid outside the instruction micro-sequence and have no meaning to any micro-instruction that belongs to an instruction different to the one that generated the value. This fact can be used to improve power saving in the processor system 200. Specifically, any time that the last micro-ops of an instruction is retired, the "valid bit" in all the ROB entries corresponding to temporary registers can be reset. These values are not relevant anymore so there is no need to copy them to the RRF.

In addition to delaying the determination whether to perform a copy of the alias register to the real register until the time the ROB entry is needed for a new instruction, there are still other methods to reduce the number of copies from alias registers to real registers. In summary, these additional methods include (1) not copying alias register to real register if the new instruction has no real register destination (e.g. a store, jump or compare operations); (2) delaying the determination of whether to perform a copy of the alias register to the real register until the ROB entry is written to by a newer instruction (i.e., after the execution of the newer instruction); (3) not copying the alias register to the real register if the new value for the alias register is the same as the existing value in the alias register; and (4) delaying the allocation of alias registers in the ROB entry to incoming instructions to further reduce alias register to real register copying.

Figure 5:
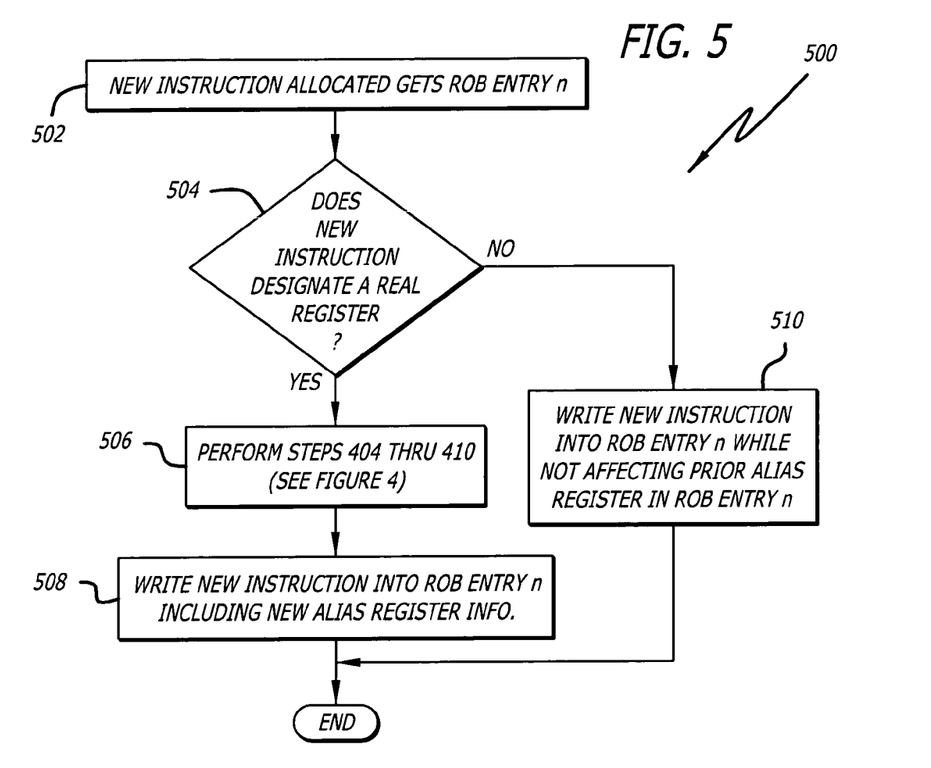
FIG. 5 illustrates a flow diagram of an exemplary method of reducing the number of ROB to RRF copies in accordance with an embodiment of the invention.

FIG. 5 illustrates a flow diagram of an exemplary method 500 of reducing the number of ROB to RRF copies in accordance with an embodiment of the invention. In summary, the method 500 entails not copying the alias register to the real register if the new instruction has no real register destination (e.g. a store, jump or compare operations). In step 502 of the method 500, the allocator 214 allocates an ROB entry n for a new incoming instruction. In step 504, the allocator 214 determines whether the new incoming instruction designates a real register. If the new incoming instruction does not designate a real register (such is the case if the new incoming instruction is a store, jump or compare operation), then the allocator 214 performs step 510 of writing the new incoming instruction into ROB entry n. The allocator 214 leaves the alias register associated with the prior instruction stored in the ROB entry n in the ROB entry n along with the new instruction information. If, on the other hand, in step 504 the allocator 214 determines that the new incoming instruction designates a real register, the allocator performs steps 404 through 412 as previously discussed. In step 508, the allocator 244 writes the new instruction information including the new alias register information into ROB entry n.

This method 500 has the potential of further reducing the number of copies made from alias registers to real registers. In the prior method 400, the determination as to whether the new instruction designates a real register is not made. Accordingly, if there is valid data in the candidate ROB entry n, according to the prior method 400, an alias register to real register copy is performed regardless of whether the new instruction designates a real register. According to the new method 500, if the new incoming instruction does not designate a real register value, an alias register to real register copy is not performed, regardless of whether the candidate ROB entry n has valid data. This extends the life of the alias register value longer, which increases the chance that the alias register value will become obsolete by the generation of a new corresponding register value by a future instruction. As a result, the copying of the alias register value in candidate ROB entry n to the real register is avoided.

Figure 6:
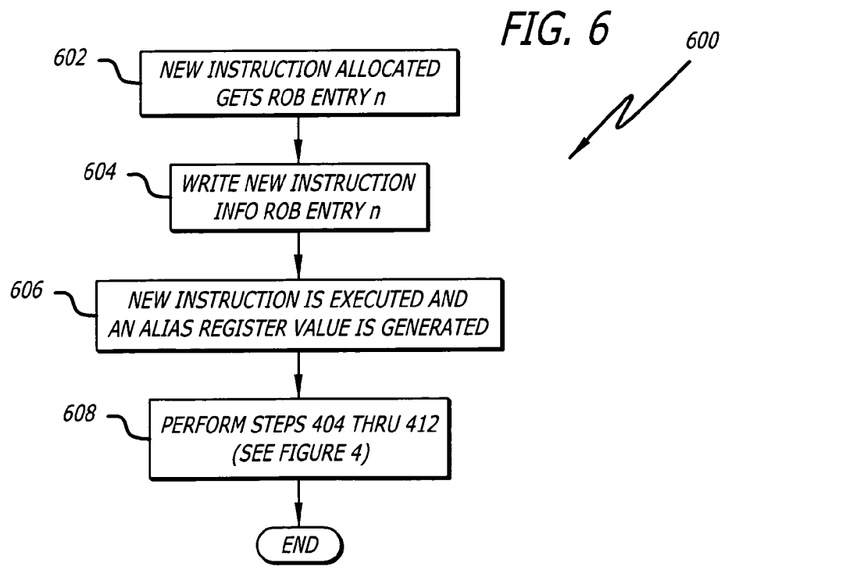
FIG. 6 illustrates a flow diagram of an exemplary method of reducing the number of ROB to RRF copies in accordance with an embodiment of the invention.

FIG. 6 illustrates a flow diagram of another exemplary method 600 of reducing the number of ROB to RRF copies in accordance with an embodiment of the invention. In summary, the method 600 entails delaying the determination of whether to perform a copy of the alias register to the real register until the ROB entry is written to by a newer instruction. In step 602 of the method 600, the allocator 214 allocates an ROB entry n for a new incoming instruction (i.e., after the execution of the new instruction). In step 604, the allocator 214 writes the new incoming instruction into the ROB entry n, without causing a copying of the alias register in the ROB entry n to the real register. In step 606, the new instruction is then executed and an alias register value is generated. Then, in step 608 the retirement unit 222 performs steps 404 through 412 as previously discussed.

This method 600 has the potential of further reducing the number of copies made from alias registers to real registers. In the prior method 400, the determination of whether to copy the alias register to the real register is made at the time the candidate ROB entry n is allocated for the new incoming instruction. According to the new method 600, the determination of whether to copy the alias register to the real register is made at the time the new register value generated by the executed new instruction is to be written into the ROB entry n. This occurs later in time then in the method 400 since the new incoming instruction has to be written into the candidate ROB entry n, moved up the pipeline for execution, and executed before the ROB to RRF copying determination is made. This extends the life of the alias register value longer, which increases the chance that the alias register value will become obsolete by the generation of a new corresponding register value by a future instruction. As a result, the copying of the alias register value in candidate ROB entry n to the real register is avoided.

Figure 7:
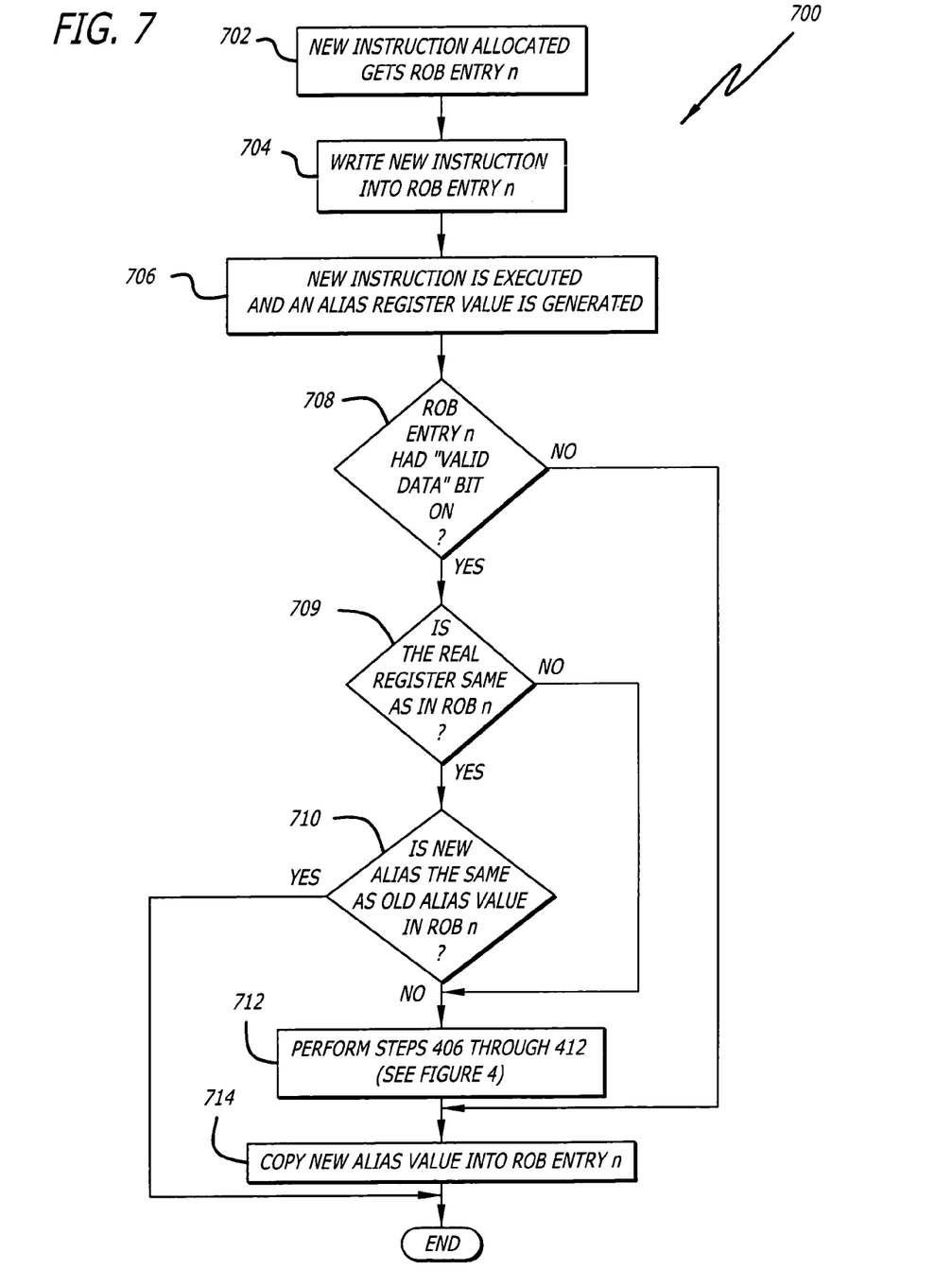
FIG. 7 illustrates a flow diagram of an exemplary method of reducing the number of ROB to RRF copies in accordance with an embodiment of the invention.

FIG. 7 illustrates a flow diagram of an exemplary method 700 of reducing the number of ROB to RRF copies in accordance with an embodiment of the invention. In summary, the method 700 entails not copying the alias register to the real register if the new value for the alias register is the same as the existing value in the alias register. In step 702 of the method 700, the allocator 214 allocates an ROB entry n for a new incoming instruction. In step 704, the allocator 214 causes the copying of the new incoming instruction into the ROB entry n, without causing a copying of the alias register in the ROB entry n to the real register. In step 706, the new instruction is executed by the execution unit 220 resulting in a new alias register value. In step 708, the retirement logic unit 222 determines whether there is valid data in the ROB entry n. If there is no valid data in the in the ROB entry n, in step 714 the retirement logic unit 222 causes the copying of the new register value into ROB entry n.

If, in step 708, the retirement logic unit 222 determines that there is valid data in the ROB entry n, in step 709 the retirement logic unit 222 determines whether the real register destination of the executed instruction is the same as specified in ROB entry n. If in step 709 the retirement logic unit 222 determined that the real register designation is not the same as that specified in ROB enter n, the retirement logic unit 222 proceeds to step 712. Otherwise, the retirement logic unit 222 proceeds to step 710. In step 710 the retirement logic unit 222 determines whether the new alias value is the same as the existing alias value in the ROB entry n. If, in step 710, the retirement logic unit 222 determines that the new alias value is the same as alias value in the ROB entry n, then the method ends for that instruction, and no alias-to-alias copying is needed. If, in step 710, the retirement logic unit 222 determines that the new alias value is not the same as alias value in the ROB entry n, then the retirement unit 222 performs steps 404 through 412 as previously discussed. After steps 404 through 412 are performed, in step 714 the retirement logic unit 222 causes the copying of the new alias value into ROB entry n.

The method 700 has the potential of further reducing the number of copies made from the alias registers to real registers. In the prior method 400, the determination of whether to copy the alias register to the real register is made at the time the candidate ROB entry n is allocated for the new incoming instruction. According to the new method 700, the determination of whether to copy the alias register to the real register is made at the time the new alias value generated by the executed new instruction is to be written into the ROB entry n, and only if the new alias value is different than the existing alias value in the ROB entry n. This occurs later in time than in the method 400 since the new incoming instruction has to be written into the candidate ROB entry n, moved up the pipeline for execution, and executed before the ROB to RRF copying determination is made. This extends the life of the alias register value longer, which increases the chance that the alias register value will become obsolete by the generation of a new corresponding register value by a future instruction. As a result, the copying of the alias register value in candidate ROB entry n to the real register is avoided.

Figure 8:
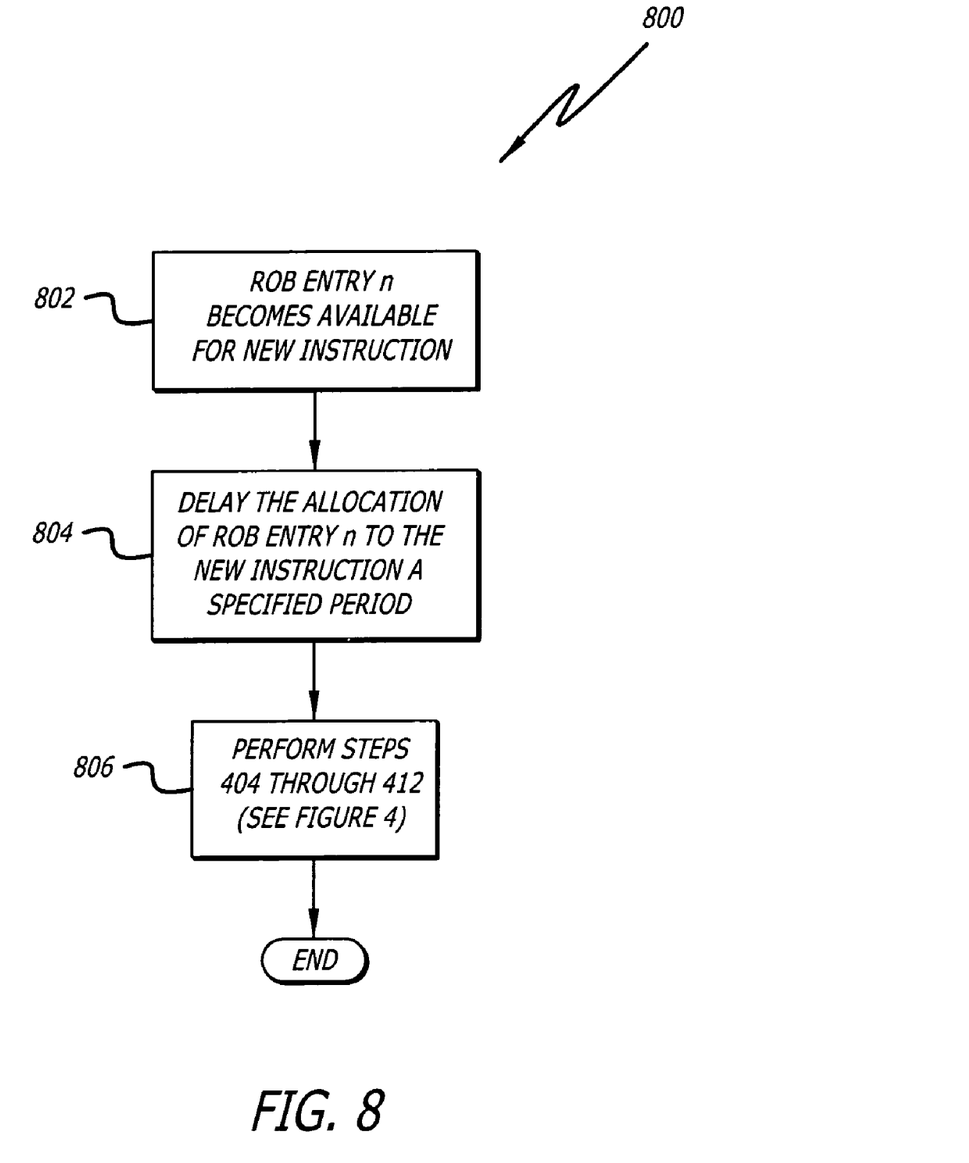
FIG. 8 illustrates a flow diagram of an exemplary method of reducing the number of ROB to RRF copies in accordance with an embodiment of the invention.

FIG. 8 illustrates a flow diagram of another exemplary method 800 of reducing the number of ROB to RRF copies in accordance with an embodiment of the invention. In summary, the method 800 entails delaying the allocation of alias registers in the ROB entry to incoming instructions to further reduce alias register to real register copying. In step 802, the ROB entry n becomes available for a new instruction. In step 804, the allocator 214 delays the allocation of the ROB entry n to the new incoming instruction by a specified time period. Such specified time period may be based on many parameters, such as, for example, a specified number of instructions being executed or retired. In step 806, the allocator 714 performs steps 404 through 412 as previously discussed.

The method 800 has the potential of further reducing the number of copies made form the alias register to real register. In the prior method 400, the determination of whether to copy the alias register to the real register is made at the time the candidate ROB entry n is allocated for the new incoming instruction. According to the new method 800, the determination of whether to copy the alias register to the real register is made at a specified time period after the candidate ROB entry n becomes available for a new incoming instruction. The specified delay extends the life of the alias register value longer, which increases the chance that the alias register value will become obsolete by the generation of a new corresponding register value by a future instruction. As a result, the copying of the alias register value in candidate ROB entry n to the real register is avoided.

In the foregoing specification, the invention has been described with reference to specific embodiments thereof It will, however, be evident that various modifications and changes may be made thereto without departing from the broader spirit and scope of the embodiments of the invention. The specification and drawings are, accordingly, to be regarded in an illustrative rather than a restrictive sense.

It is claimed:

1. A method comprising:
providing a reorder buffer comprising a plurality of entries associated respectively with a plurality of instructions;
allocating one of said reorder buffer entries for an incoming instruction, wherein said allocated reorder buffer entry includes an alias register associated wit a prior instruction;
determining whether said incoming instruction designates a real register;
determining whether said alias register contains valid data;
if said alias register contains the valid data, determining whether said alias register has the same value as a new alias register allocated to said reorder buffer entry; and
copying the content of said alias register to said real register if said alias register contains valid data.

2. The method of claim 1, further comprising:
modifying said allocated reorder buffer entry to include said incoming instruction with said alias register associated with said prior instruction if it is determined that said incoming instruction does not designate said real register.

3. The method of claim 1, wherein determining whether said alias register contains valid data comprises reading an asserted valid data field associated with said reorder buffer entry.

4. The method of claim 3, further comprising deasserting the valid data field if the content of said alias register is copied to said real register.

5. The method of claim 4, further comprising:
modifying a data commitment table to indicate that said real register value is in the real register if the content of said alias register is copied to said real register.

6. A processor system comprising:
a reorder buffer comprising a plurality of entries associated respectively with a plurality of instructions;
an allocator to:
allocate one of said reorder buffer entries for an incoming instruction, said allocated reorder buffer entry includes an alias register associated with a prior instruction,
determine whether said incoming instruction designates a real register, and
modify said allocated reorder buffer entry to include said incoming instruction with said alias register associated with said prior instruction if it is determined that said incoming instruction does not designate said real register; and
a retirement unit to determine whether to cause the copying of said alias register to said real register after execution of said incoming instruction by (i) determining whether said alias register contains valid data, (ii) determining whether said alias register stores a value identical to a value associated with a new alias register allocated to said reorder buffer entry, and (iii) copying content of said alias register to said real register if said alias register does not have the same value as the new alias register allocated to said reorder buffer entry.

7. The processor system of claim 6, wherein the allocator determines whether said alias register contains valid data and copies the content of said alias register to said real register if said alias register contains valid data.

8. The processor system of claim 7, wherein the allocator determines whether said alias register contains valid data by reading an asserted valid data field associated with said reorder buffer entry.

9. The processor system of claim 8, wherein the allocator deasserts the valid data field if the content of said alias register is copied to said real register.

10. The processor system of claim 9, wherein the allocator causes a modification of a data commitment table to indicate that said real register value is in the real register if the content of said alias register is copied to said real register.

11. A method comprising:
providing a reorder buffer comprising a plurality of entries associated respectively with a plurality of instructions;
allocating one of said reorder buffer entries for an incoming instruction, wherein said allocated reorder butter entry includes an alias register associated with a prior instruction;
modifying said allocated reorder buffer entry to include said incoming instruction;
executing said incoming instruction which generates an alias register value; and
determining whether to copy said alias register to a real register after the execution of said incoming instruction, comprising (i) determining whether said alias register contains valid data, (ii) if said alias register contains valid data, determining whether said alias register has a same value as a new alias register allocated to said reorder buffer entry, and (iii) copying content of said alias register to said real register if said alias register does not have the same value as said new alias register allocated to said reorder buffer entry.

12. The method of claim 11, wherein determining whether to copy said alias register to said real register comprises:
determining whether said alias register contains valid data; and
copying the content of said alias register to said real register if said alias register contains valid data.

13. The method of claim 12, wherein determining whether said alias register contains valid data comprises reading an asserted valid data field associated with said reorder buffer entry.

14. The method of claim 13, further comprising deasserting the valid data field if the content of said alias register is copied to said real register.

15. The method of claim 14, further comprising:
modifying a data commitment table to indicate that said real register value is in the real register if the content of said alias register is copied to said real register.

16. A processor system comprising:
a reorder buffer comprising a plurality of entries associated respectively with a plurality of instructions;
an allocator to (i) allocate one of said reorder buffer entries for an incoming instruction, said allocated reorder buffer entry includes an alias register associated with a prior instruction, and (ii) modify said allocated reorder buffer entry to include said incoming instruction;
an execution unit to execute said incoming instruction which generates a real register value; and
a retirement unit to determine whether to cause the copying of said alias register to a real register after the execution of said incoming instruction by (i) determining whether said alias register contains valid data, (ii) if said alias register contains valid data, determining whether said alias register has a same value as a new alias register allocated to the reorder buffer entry, and (iii) copying content of said alias register to said real register if said alias register does not have the same value as the new alias register allocated to the reorder buffer entry.

17. The processor system of claim 16, wherein said retirement unit determines whether to copy said alias register to said real register by:
determining whether said alias register contains valid data; and
copying the content of said alias register to said real register if said alias register contains valid data.

18. The processor system of claim 17, wherein said retirement unit determines whether said alias register contains valid data by reading an asserted valid data field associated with said reorder buffer entry.

19. The processor system of claim 18, wherein said retirement unit deasserts the valid data field if the content of said alias register is copied to said real register.

20. The processor system of claim 19, wherein said retirement unit causes the modifying of a data commitment table to indicate that said real register value is in the real register if the content of said alias register is copied to said real register.

21. A retirement unit, coupled to a reorder buffer including a plurality of reorder buffer entries associated with a plurality of instructions, to determine whether to cause copying of an alias register to a real register after execution of an incoming instruction, comprising:
means for determining whether said alias register contains valid data;
means for determining whether said alias register has a same value as a new alias register allocated to a first reorder buffer entry of the plurality of reorder buffer entries if said alias register contains the valid data; and
means for copying content of said alias register to said real register if said alias register does not have the same value as the new alias register allocated to the first reorder buffer entry.

22. The retirement unit of claim 21 being implemented within a system that comprises an allocator coupled to the reorder buffer.

23. The retirement unit of claim of claim 22 being implemented within the system that comprises an execution unit coupled to the reorder buffer.

24. The retirement unit of claim 21 being implemented within an executing processing stage of a processor system.

* * * * *

UNITED STATES PATENT AND TRADEMARK OFFICE
CERTIFICATE OF CORRECTION

PATENT NO. : 7,024,542 B2  
APPLICATION NO. : 10/183096  
DATED : April 4, 2006  
INVENTOR(S) : Savransky et al.

Page 1 of 1

It is certified that error appears in the above-identified patent and that said Letters Patent is hereby corrected as shown below:

In column 10, at line 10, delete [wit] and insert --with--.

Signed and Sealed this

Eighteenth Day of July, 2006

JON W. DUDAS  
*Director of the United States Patent and Trademark Office*